STORAGE AND RETRIEVAL OF ORTHOGONALLY RELATED SIGNALS

INVENTORS
JOHN E. GILLIS
JOHN Q JOHNSON
BY Robert T. Dunn
AGENT

STORAGE AND RETRIEVAL OF ORTHOGONALLY RELATED SIGNALS

INVENTORS
JOHN E. GILLIS
JOHN Q. JOHNSON
BY Robert T. Dunn
AGENT

STORAGE AND RETRIEVAL OF ORTHOGONALLY RELATED SIGNALS

Filed Nov. 4, 1963 4 Sheets-Sheet 3

INVENTORS
JOHN E. GILLIS
JOHN Q. JOHNSON
BY Robert T. Dunn
AGENT

Aug. 22, 1967 J. E. GILLIS ET AL 3,337,858

STORAGE AND RETRIEVAL OF ORTHOGONALLY RELATED SIGNALS

Filed Nov. 4, 1963 4 Sheets-Sheet 4

INVENTORS
JOHN E. GILLIS
JOHN Q. JOHNSON
Robert T. Dunn
AGENT

1

3,337,858
STORAGE AND RETRIEVAL OF ORTHOGONALLY RELATED SIGNALS

John E. Gillis, Burlington, and John Q. Johnson, Dorchester, Mass., assignors to Massachusetts Institute of Technology, Cambridge, Mass., a corporation of Massachusetts Filed Nov. 4, 1963, Ser. No. 321,021
19 Claims. (Cl. 340—174.1)

ABSTRACT OF THE DISCLOSURE

A system is provided for storing information at a relatively high rate and for retrieving the information from storage at a relatively low rate, as signals which are orthogonally related to each other and which can be detected and distinguished from each other, employing matched filters. More particularly, input signals which represent information are sequentially stored at a rate substantially greater than necessary to maintain orthogonality between the input signals. The stored signals are then detected at a substantially lower rate and the frequency of each detected stored signal is changed as necessary to provide orthogonality between the detected signals, which are then distinguished one from another employing matched filters.

This invention relates to information transfer systems wherein orthogonally related sets of signals are detected by filters matched to the signals and more particularly to an improved tape recording and readout system capable of recording signals at a high rate.

Heretofore, orthogonally related signals have been distinguished by applying the signals to a bank of filters, each filter being matched to a different one of the signals. As each signal is applied to the bank of filters, its autocorrelation function will be produced at the output of the filter which is matched to the signal and so this filter will produce a relatively large output, whereas the other filters which are not matched to the signal will produce relatively low outputs. Since the frequency spectra of the signals are orthogonally related, the autocorrelation function of a given signal produced at the output of the filter matched to the signal will produce a peak at the same instant the outputs from the remaining filters which are initiated by the same signal, reach a null. Thus, the orthogonally related signals are easily distinguished one from the other by merely noting which of the matched filters produces a relatively large output at the particular instant when the other filters are producing substantially no output. The required orthogonal relationship between the signals is achieved when the signals are all of length $\tau$ and the frequency differences between signals are integral multiples of $1/\tau$. For example, if the signals are transmitted one after the other as pulses with substantially no interval between, then the difference in frequency between signals must be integral multiples of the pulse frequency rate of transmission. The technique for generating, transmitting and detecting signals in this manner is sometimes referred to as orthomatch. It is one object of the present invention to provide a system for transferring information in the form of a set of such orthogonally related signals and to detect with substantial reliability the information employing matched filters and provide inputs to data processing equipment.

2

In one embodiment of the present invention, information signals are stored on magnetic tape. The rate at which information is recorded by a tape recording system is generally limited by the maximum packing density of the tape usually expressed in bits per inch. Generally, the bandwidth of the tape recorder limits the rate at which the recorder can accept and record information. The bandwidth of a tape recorder determines the packing density of the tape. Thus, if the tape is driven at a given speed, the packing density will dictate the number of bits of information per second that can be recorded by the tape.

It is another object of the present invention to record information signals on tape at a greater pulse frequency rate and at the same time employ the orthomatch technique to insure reliability at readout.

It is another object of the present invention to provide a tape recording system employing the orthomatch principle and in which the effective packing factor of the recording system is substantially increased.

It is a feature of an embodiment of the invention to encode and transfer a plurality of different harmonically related frequency signals at a relatively high rate and then detect the signals and increase the frequency of each so that the spectra of the signals are orthogonally related.

It is another feature of the present invention to record encoded frequency signals at at least twice the rate required for orthogonality, and to read out the recorded signals and increase the frequency of each at readout to effect thereby the orthogonal relationship between the signals and then detect and distinguish the signals from each other with matched filters.

Other features and objects of the invention will be more apparent from the following specific description taken in conjunction with the figures in which.

Figure 1:
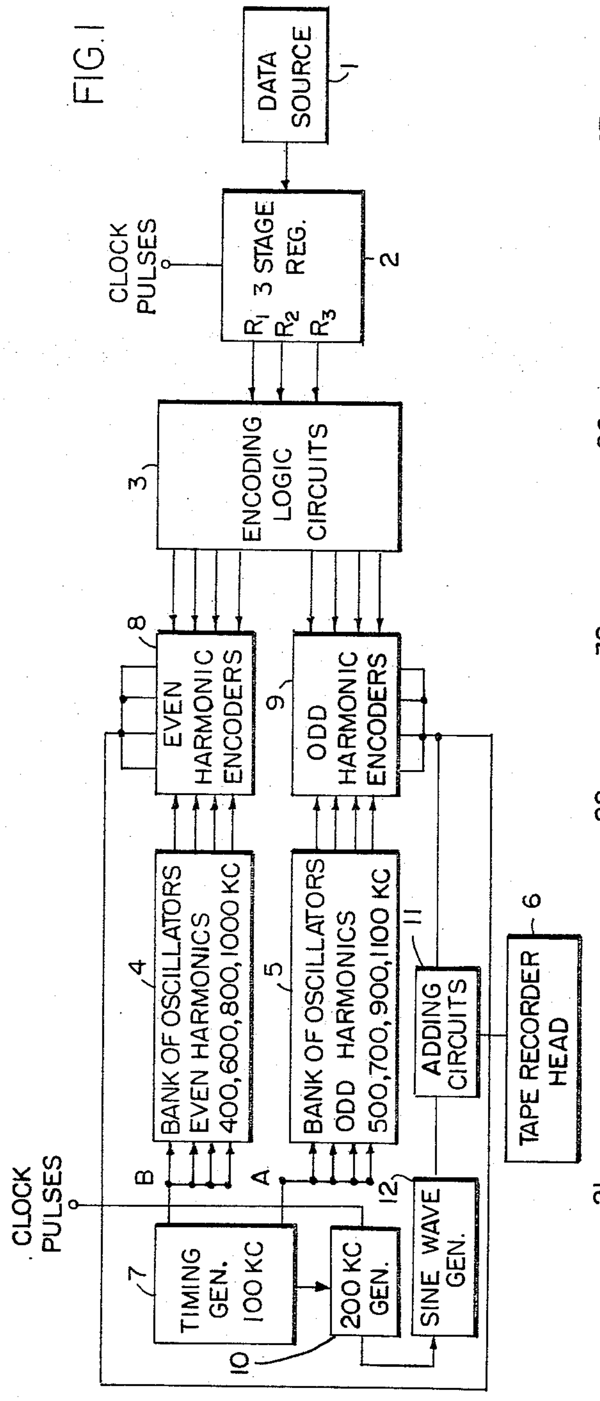
FIGURE 1 is a block diagram of recording equipment for recording encoded frequency signals at a rate at least twice that required to make the signals orthogonal.
Figure 2:
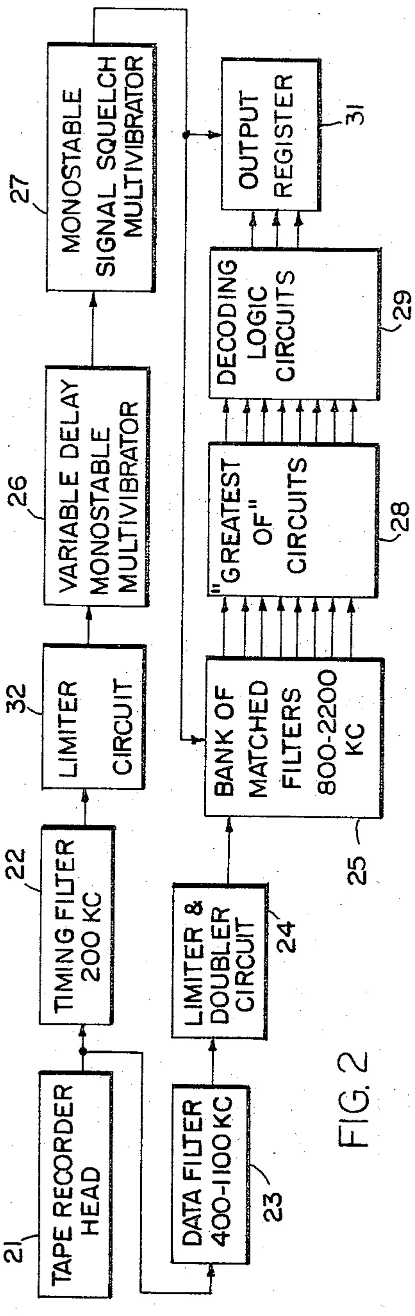
FIGURE 2 is a block diagram of the readout system for reading out the recorded frequency signals and imposing the required orthogonality so that matched filters will respond to produce outputs distinguishing the signals from each other.

The information recording and readout systems shown in FIGURES 1 and 2 incorporate circuits for encoding data information represented by binary numbers stored in a register into a plurality of different frequency signals. These frequency signals each represent different binary numbers stored in the register. In this embodiment, a three-stage register is employed and so eight different signals are employed to represent all possible numbers which the register can store. The readout system in FIGURE 2 detects the different signals and determines at successive instants of time which signal is being detected. A bank of matched filters is provided for distinguishing the signals from each other. Each of these matched filters is matched to a different one of the detected signals. It has been found that when the signals are orthogonally related, only the filter which is matched to the signal will produce an output when the signal is received whereas the other filters not matched to the signal will produce substantially no output. This principle of operation whereby orthogonally related signals are sharply distinguished from each other, by filters matched to the signals is referred to as orthomatch. The present invention makes use of the orthomatch principal to sharply distinguish the different signals from each other in the readout process. The different frequency signals are encoded in accordance with data and stored on magnetic tape. The rate at which the signals are stored, and the highest frequency of the signals, are limited by the operating bandwidth of the tape which in turn limits the packing factor of the tape. By use of the present invention, the capacity of the system to record and reliably read out orthogonally related signals in accordance with the orthomatch principle is substantially increased, and as a result the packing factor of the tape is increased as will be seen hereinbelow.

The recording system illustrated in FIGURE 1 includes a source of data which may be simply a transducer detecting changes in a parameter. This analog data is converted to digital form and stored in a three stage register 2 which samples the data source with each clock pulse. If there is no change in the data, then the information recorded in register 2 remains the same from clock pulse to clock pulse. The output of register 2 is applied to encoding logic circuits 3 which determine which frequency signal from the banks of harmonic oscillators 4 and 5 will be selected to represent the value stored in the register 2 and be fed to a tape recording head 6 which imposes information by magnetic orientation in a moving strip of magnetic tape. The different frequency signals selected are separated in frequency from each other by integral multiples of the same amount. For example, they are separated from each other by multiples of 100 kc., yielding the set of frequencies 400 to 1100 kc. of which 4 are even harmonics and 4 are odd harmonics of 100 kc. For reasons which will be apparent hereinbelow, it is required that certain of these frequency signals be inverted in phase under certain circumstances to thereby afford greater reliability in readout. For this reason the frequencies are generated by two banks of oscillators, one generating even harmonics and the other generating odd harmonics in response to 100 kc. trigger signals from the timing generator 7 and both banks generating both phases. The outputs of the encoding logic circuits 3 gate the outputs of the banks of oscillators to select the proper frequency and phase representing information stored in the register 2 at the occurrence of each of the clock pulses. Thus, a chain of signal pulses are fed to the tape recording head 6, with substantially zero intervals between each signal pulse and the signal pulses are each composed of one of the even or odd harmonic frequencies of a predetermined phase as determined by the encoding logic circuits 3. The outputs of the encoders are combined and then added in adding circuit 11 to a 200 kc. sine wave signal generated by generator 12 in response to clock pulses from generator 10.

Since the clock pulses are generated at a 200 kc. rate and, thus, the rate of generation of the frequency siganls is 200 kc., it is apparent that the frequency signals applied to the tape recorder head, are not orthogonally related to each other. That is, they are not separated in frequency by integral multiples of $1/\tau$ where $\tau$ is the duration of each of the frequency signals. In fact, the frequency signals are generated at twice the rate required for such orthogonality. For a given tape speed at given maximum frequency signal, the rate at which signals are recorded may be increased substantially many times without exceeding the operating bandwidth of the tape. Thus, operation at 200 kc. rate rather than 100 kc. is readily accomplished without exceeding the operating bandwidth of the tape, and will result in a rate of information storage twice that which would be obtained at 100 kc. However, the orthogonal relationship between the signals is not obtained at this point.

It is one function of the readout system shown in FIGURE 2 to impose the orthogonal relationship between the different frequency signals so that they can be sharply distinguished from each other by a bank of matched filters. The readout system shown in FIGURE 2 includes a tape recorder head 21 operating in conjunction with the tape on which the signals are impressed by the system shown in FIGURE 1. In the readout system the tape speed may be whatever is suitable and need not be the same as the tape speed in the recording system. The output from the recorder head 21 is fed to timing filter 22 and data filter 23 which extract the timing and data information, respectively. Since the timing as indicated above during recording is 200 kc., the filter 22 is tuned to 200 kc. times the ratio of readout tape speed to recording tape speed. Similarly, the data filter 23 detects the frequency signals and, thus, is tuned to detect frequencies in the range of 400 to 1100 kc. times the ratio of readout tape speed to recording tape speed. Thus, when readout tape speed is considerably slower than recording tape speed, the filters 22 and 23 will be tuned to frequencies which are a fraction of the timing frequencies and signal frequencies in the recording system of FIGURE 1. The relationship between the different frequency signals and the clock rate, however, will be retained and if the clock rate is twice the difference between adjacent frequency signals during recording then this relationship will be retained at readout.

The orthogonal relationship between readout frequency signals is established by doubling the frequency of the readout signals so that the difference between successive frequency signals is the same as the readout clock rate. For this purpose, a limiter and doubler circuit 24 is provided, doubling the frequency output from filter 23. The output of doubler circuit 24 energizes a bank of matched filters 25 tuned to frequencies 800 to 2200 kc. in increments of 200 kc. Each of these filters is matched to a different one of the frequency signals from the doubler circuit and will produce a relatively large output when that signal is launched into the filters, whereas the other filters will produce relatively small output.

As already mentioned, the filter matched to the signal will produce a substantial output whereas filters not matched to signal will produce substantially no output if the signals are orthogonally related and the greatest difference in filter outputs occurs when the outputs are inspected at a given, predetermined interval of time. Thus, the outputs of the bank of matched filters 25 are necessarily inspected at a prescribed interval of time. For this purpose a pulse signal is generated for squelching the outputs of the bank of filters at the interval of time when the difference between outputs is the greatest. This signal is generated by a variable delay multivibrator 26 and a signal multivibrator 27. The functioning of these multivibrators will be more apparent from detailed descriptions hereinbelow.

The outputs of the matched filters are applied to a circuit 28 for determining which filter output is greatest. This circuit is denoted the "greatest of" circuit and is described in fuller detail hereinbelow. Depending upon which signal is received, one of a multitude of outputs from the "greatest of" circuit will at any given instant energize the decoding or logic circuits 29, wherein a binary number is generated representative of the information contained by the signal.

The outputs of the "greatest of" circuit 28 are each representative of a different binary number in register 2 which controls the encoding logic. The reverse function is performed by decoding circuits 29 to obtain the same three bit binary number at readout and this number is clocked into the register 31 by a clock pulse derived from recovered timing.

Figure 6:
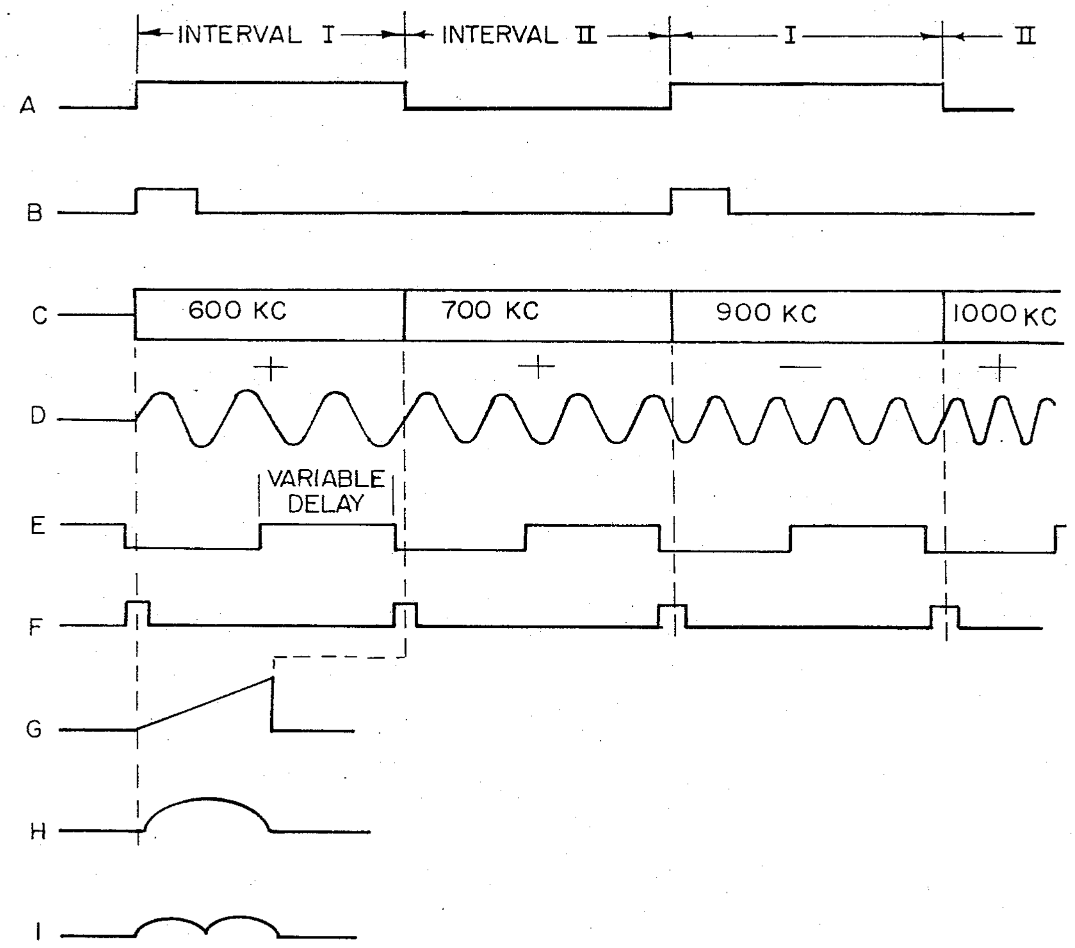
FIGURE 6 illustrates waveforms to aid in understanding the operation of the circuits and equipment shown in FIGURES 1 through 4.

Waveforms A to I in FIGURE 6 illustrate the nature of some of the signals generated in the recording and readout systems of FIGURES 1 and 2. Waveform A illustrates the 100 kc. pulses from timing generator 7 which are applied to the bank of oscillators 4 generating odd harmonics, and waveform B represents the waveform from the generator applied to the bank 5 generating even harmonics. It is convenient to generate even harmonics with a nonsymmetrical waveform whereas odd harmonics are best generated with a symmetrical waveform. These waveforms A and B are fed to odd and even harmonic ringing circuits which will be described in more detail herein below with reference to FIGURE 3.

The timing pulses in waveforms A and B cause the banks of harmonic generators to produce their design frequencies which are then gated or encoded depending on a schedule demanded by encoding logic circuits 3 and combined and fed to the adding circuit 11 where a 200 kc. sine wave is aded to carry clock rate. The envelope of the combined encoded frequency signals is shown in waveform C and includes an uninterrupted string of different frequency signals, each representing three bit binary values, the duration of each frequency signal being 1/200 kc. For example, if the sequence of frequency signals is as shown in the figures in waveform C, that is, 600, 700, 900, 1000 kc. in that order, then the combined signal waveform at the input to the adding circuit 11 will be as indicated by waveform D. It is preferred that there be coherency between the sequential frequency signals and that the string proceed from one to the other without discontinuities which introduce high frequency components. From this it follows that when the rate of the signals is twice that required for orthogonality, phase reversals of some of the signals must be initiated to avoid discontinuities. A simple code can be set which dictates just where and when these phase reversals must occur. Inspection reveals that phase reversals must occur during the intervals denoted II, shown in waveform A, when an even harmonic follows an odd harmonic or when an odd harmonic follows an even harmonic. A circuit performing this logic is shown in detail in FIGURE 3 and is discussed below.

The squelching pulses applied from the monostable multivibrator 27 to the bank of matched filters 25 are generated as illustrated by waveforms E and F. Timing pulses from filter 22 are shaped by limiter circuit 32 producing pulses similar in shape to pulses shown in waveform A except that the time basis may be different as dictated by difference in tape speed during record and readout. These pulses from limiter circuit 32 are applied to a variable delay multivibrator 26 which produces variable length pulses such as illustrated in waveform E. The variable length pulses are initiated by the trailing edge of pulses from the limiter circuit 32 and the length is determined by adjustment of circuit constants in the multivibrator 26. The pulses from multivibrator 26 are fed to monostable multivibrator 27 and the trailing edge of these pulses triggers operation of multivibrator 27 which produces the short duration squelching pulses which bracket the interval between information signals. These pulses, shown in waveform F, are employed to squelch the outputs of the bank of filters at the clock rate and, as a result, the filters are matched to the frequency signals and each produces the autocorrelation function of the signal to which it is matched when energized by that signal.

It has been observed that during the squelch interval, the output of the filter which is matched to the incoming signal will be a maximum, whereas the outputs of other filters not matched to the incoming signal will be a minimum. This feature is illustrated by waveforms G, H, and I which represent the outputs of three different matched filters in response to a signal which only one of the filters is matched to. Where, for example, the signal is 1200 kc., the output of the 1200 kc. matched filter will be as illustrated by waveform G whereas the outputs of the 1400 and 1600 kc. filters will be as illustrated by waveforms H and I. It will be noted that the difference between outputs of these filters is greatest and the incoming signal can be most readily distinguished, during the interval of the squelch pulses shown in waveform F. Thus, the "greatest of" circuit 28 compares the outputs of the matched filters and energizes the decoding or logic circuits 29 accordingly.

Figure 3:
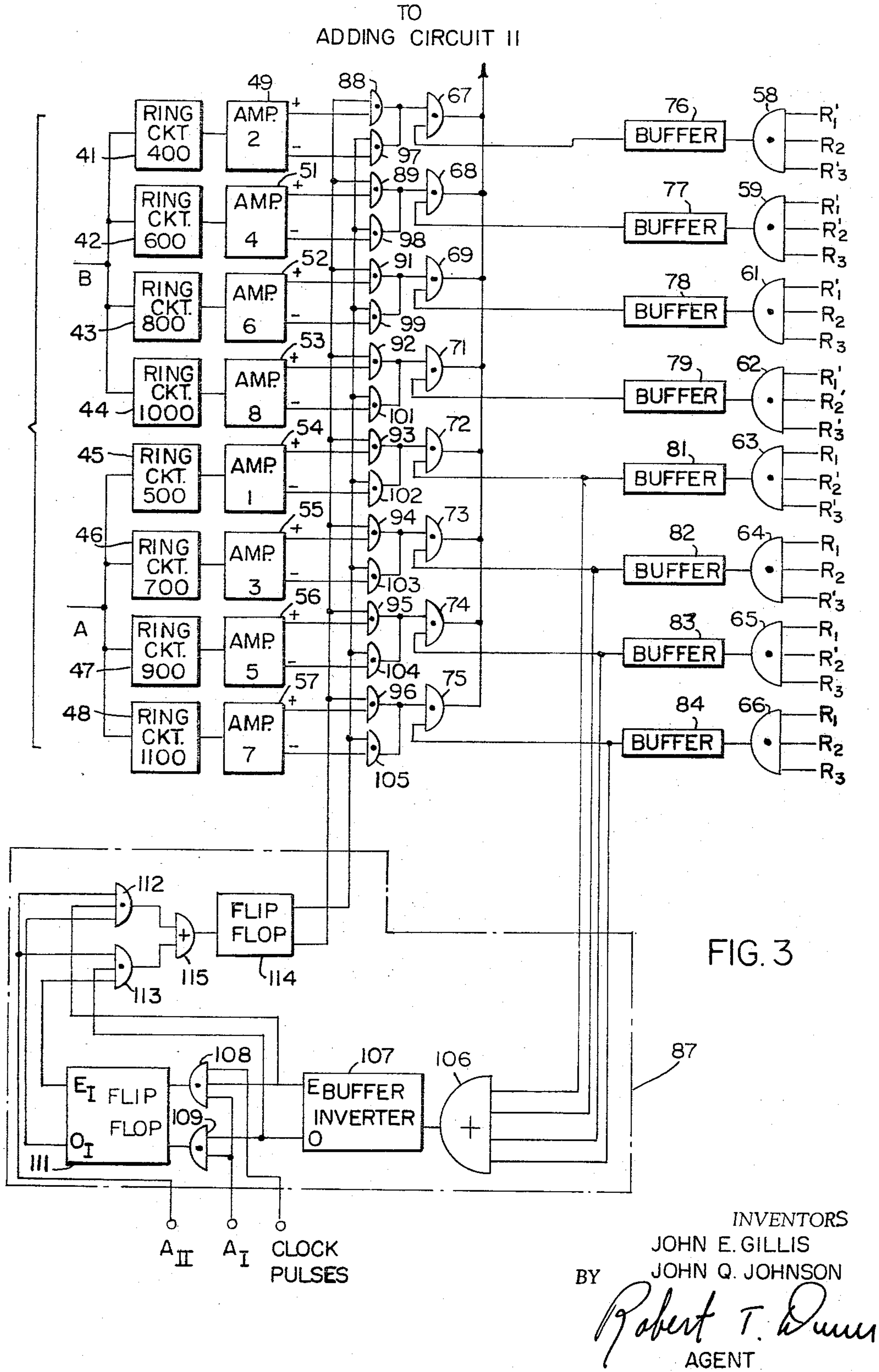
FIGURE 3 is a block diagram illustrating equipment for generating and encoding the plurality of frequency signals in accordance with information from a source of data.

Details of the encoding logic circuits 3 and even and odd hamonic encoders 8 and 9 shown in FIGURE 1 are illustrated in FIGURE 3. Each of the banks of oscillators 4 and 5 includes, for example, a ringing circuit for each of the frequencies generated and these ringing circuits are triggered by pulses from the timing generator 7. The even harmonics are generated by ringing circuits 41 to 44 triggered by pulses illustrated in waveform B and the odd harmonics are generated by ringing circuits 45 and 48 triggered by pulses illustrated in waveform A. The output of each ringing circuit is fed to an amplifier circuit producing plus and minus phase outputs. For this purpose amplifiers 49 to 57 are provided each coupled to a different one of the ringing circuits. Selected outputs from the amplifiers are combined to form the chain of frequency signals such as illustrated in waveforms C and D which energize the magnetic head of the tape recorder. This selection for encoding of amplifier outputs depends upon the binary value stored in the three stage register 2. The outputs of the three stage register are denoted generally $R_1$, $R_2$, and $R_3$, and the complements $R_1'$, $R_2'$, and $R_3'$. These six outputs are fed to the AND gates 58 through 66 as shown in FIGURE 3. The AND gates 58 to 66 are associated with the ringing circuits 41 to 48 and amplifiers 49 to 57 respectively and select the proper amplifier output by controlling AND gates 67 to 75 through buffer circuits 76 to 84. The gates 67 to 75 feed the selected frequency signals to common bus 85 which conducts the chain of signals to adding circuit 11. For example, gate 66 produces an output when $R_1$, $R_2$, and $R_3$ outputs from the three stage register occur. These outputs from the register occur when the highest number is stored in the register and as a consequence, the highest frequency (1100 kc.) from the ringing circuits will be fed to the adding circuit 11 to represent the number in the register. Examination will show that the other frequency signals which correspond to different values stored in the register will be selected in the same manner.

As mentioned above, the outputs of the amplifiers 49 through 57 are selected to produce a train of frequency signals representing sequential numbers stored in the three stage register 2. Furthermore, the frequency signals are preferably in a prescribed phase so that discontinuities between signals are substantially eliminated. Elimination of such discontinuities is not absolutely required; however, the readout system functions more reliably when there are no such discontinuities at the transitions. For this purpose, the phase of each frequency signal must be selected. A phase logic circuit 87 for computing these conditions is included between the outputs of the odd harmonic gates 63 to 66 and a bank of gates 88 through 105 which combine the outputs of the ringing circuit amplifiers into a chain of signals which is fed to the adding circuit 11. The phase logic circuit includes an odd harmonic OR gate 106 driving buffer inverter 107 which produces an output representing odd and an output representing even harmonics. These outputs are gated by waveform A and clock pulses in AND gates 108 and 109 which set and clear flip flop circuit 111. Thus, the outputs of flip flop 111, denoted $O_I$ and $E_I$, represent the occurrence of odd and even harmonics in the last interval I. These outputs, $O_I$, and $E_I$, are gated by the down portion of waveform A, representing interval II, and the E and O outputs from buffer inverter 107 respectively, in AND gates 112 and 113. These gates produce pulse signals each time a phase reversal is required and energize flip flop circuit 114 through OR gate 115. One stage of flip flop 114 controls positive AND gates 88 to 96 and the other controls negative AND gates 97 to 105 which control phase selection of the frequency signals from the ringing circuits. Thus, the phase of the frequency signals in the chain is reversed as required to avoid discontinuities.

Figures 4, 5:
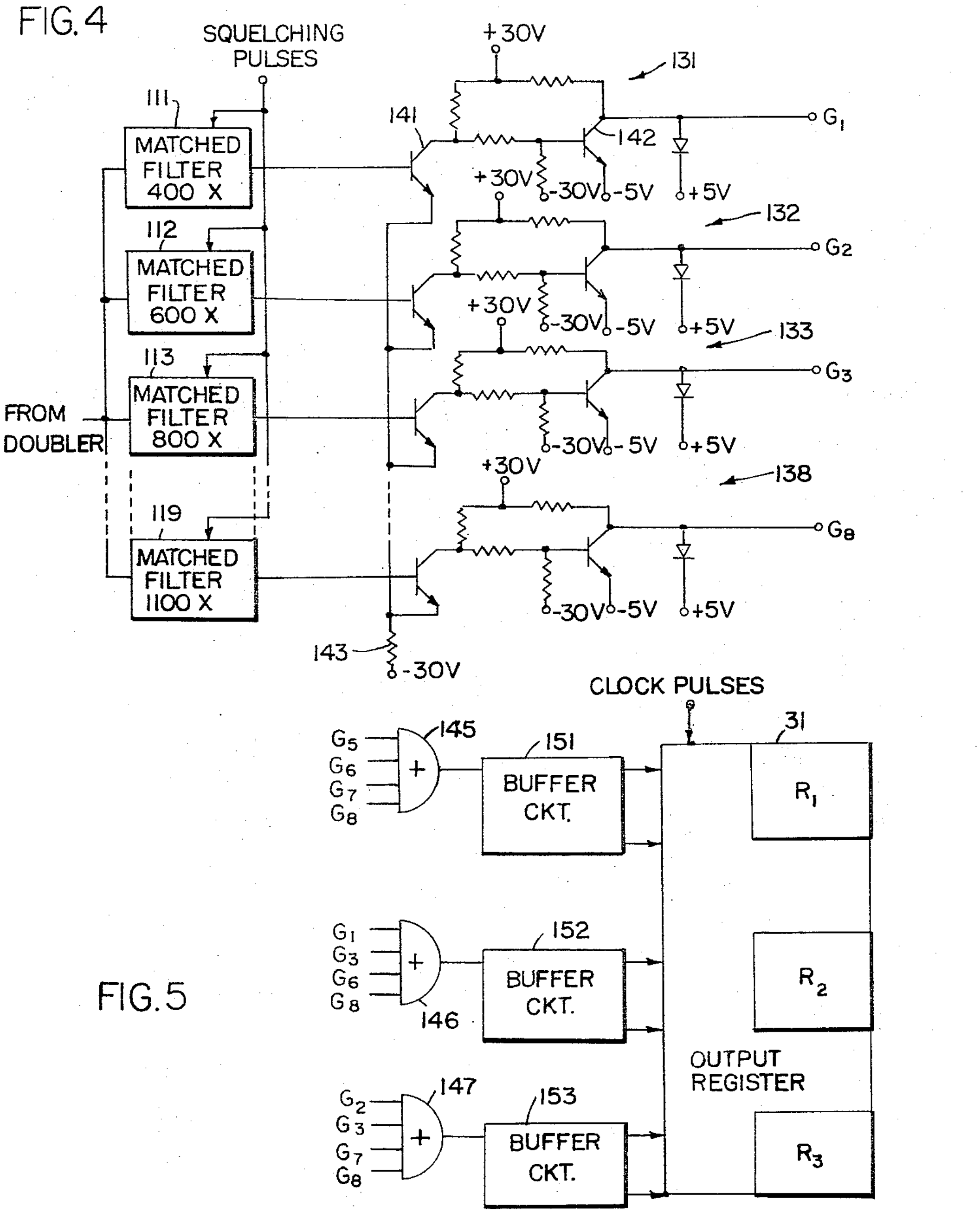
FIGURE 4 is a partial block diagram and schematic to illustrate equipment for distinguishing the different signals and determining which is received at a given instant.
FIGURE 5 is a block diagram illustrating the logic circuits for decoding the received signals and extracting said information.

Various elements of the readout system shown in FIGURE 2 are each constructed and operated in well known manner. The "greatest of" circuit and decoding logic circuits are not well known and are shown in detail in FIGURES 4 and 5. The bank of matched filters 25 includes a separate matched filter circuit for each of the signal frequencies. These filter circuits, denoted 111 to 119, FIGURE 4, are all energized by the chain of orthogonally related frequency signals from the doubler circuit 24 and are also squelched simultaneously by squelch pulses from multivibrator 27. In operation, the autocorrelation function of each frequency signal is produced at the output of the filter which is matched to the signal. The squelching serves a dual purpose: it determines the interval of integration in the autocorrelation process; and it returns each filter circuit to a quiescent state at the initiation of the next frequency signal in the chain.

The "greatest of" circuit shown in detail in FIGURE 4 includes a plurality of similar circuits 131 to 138 each coupled to the output of one of the matched filters. These circuits each includes a first common emitter n-p-n transistor such as 141 whose output is amplified by a second n-p-n transistor 142. Each of the first mentioned transistors in the "greatest of" circuit have the emitter coupled to a common impedance 143. Thus, when any of these transistors is caused to conduct substantially more current than the others, the others will be turned off. For example, when the output of matched filter 111 is substantially greater than the outputs of the other matched filters, then transistor 141 will conduct substantially more current than the corresponding transistors in the circuits 132 to 138. Thus, a pulse will be produced in the output circuit of transistor 141 and this pulse will be amplified and appear at terminal $G_1$ whereas no such pulse will appear at the other terminals $G_2$ to $G_8$.

The pulse signals appearing at the terminals $G_1$ through $G_8$ are decoded by the circuit shown in FIGURE 5. This circuit includes three OR gates, 145 to 147 responsive to the outputs $G_1$ to $G_8$ from the "greatest of" circuit as illustrated. The outputs of these gates energize stages of binary register 31 through buffer circuits 151 to 153 in response to each clock pulse from limiter 32 or squelch pulse from multivibrator 27.

The logic circuits shown in FIGURE 5 are intended to convert the frequency signals to three bit binary numbers as this is a convenient form in which to use the information. However, the signals could be converted directly to analog representations in any suitable manner depending upon the use and function intended.

This completes the description of one embodiment of the present invention wherein orthogonally related signals are fed to matched filters to distinguish the signals and wherein the detected signals as generated, transmitted and/or stored are not orthogonally related but are transmitted and/or stored at a rate substantially higher than that which would preserve the orthogonal relationship between the signals and wherein the required orthogonal relationship is imposed at readout or reception of the signals and before the signals are fed to the matched filters, thus increasing the rate of information, transfer or storage within the bandwidth of operation of the transmission or storage systems. The particular embodiment of the invention described herein makes use of a magnetic tape storage and circuits for encoding and decoding the frequency signals to represent binary numbers. It should be clearly understood that this embodiment is described by way of example only and should not limit the spirit and scope of invention as set forth in the accompanying claims.

We claim:

1. In an information transfer system wherein output information is represented by different orthogonally related frequency signals which are distinguished from each other by matched filters, the improvement comprising a source of input frequency signals, each corresponding to a different one of said orthogonally related frequency signals, means for transferring frequency signals at a rate different from that required to provide an orthogonal relationship between said input frequency signals, means for detecting the transferred signals, means for changing the frequencies of the detected signals to provide said orthogonal relationship and means for coupling the orthogonally related signals to said matched filters.

2. In an information transfer system wherein output information is represented by different orthogonally related frequency signals which are distinguished from each other by matched filters, the improvement comprising a source of input frequency signals, each corresponding to a different one of said orthogonally related frequency signals, means for transferring frequency signals at a rate greater than that required to provide an orthogonal relationship between said input frequency signals, means for detecting the transferred signals, means for increasing the frequencies of the detected signals to provide said orthogonal relationship and means for coupling the orthogonally related signals to said matched filters.

3. In an information transfer system wherein output information is represented by different orthogonally related frequency signals which are distinguished from each other by matched filters, the improvement comprising a source of input frequency signals, each corresponding to a different one of said orthogonally related frequency signals, means for transferring frequency signals at a rate at least twice the rate required to provide the orthogonal relationship between said input frequency signals, means for detecting the transferred signals, means for increasing the frequencies of the detected signals to provide said orthogonal relationship and means for coupling the orthogonally related signals to said matched filters.

4. An information recording and readout system comprising means for generating a plurality of different input frequency signals, means for encoding said input frequency signals to represent prescribed information, means for recording said encoded input frequency signals one after another at a record rate greater than that required to make the recorded signals orthogonally related and means for reading said recorded input signals at a read rate including means for detecting said recorded frequency signals, means for altering the frequencies of said detected signals so that said altered frequency signals are orthogonally related, matched filter means for detecting said orthogonally related signals and decoding means responsive thereto for determining said information.

5. An information recording and readout system comprising means for generating a plurality of different input frequency signals which are harmonically related to a given frequency, means for encoding said input frequency signals to represent prescribed information, means for recording said encoded signals at a rate greater than said given frequency, and readout means for determining said information at a substantially slower read rate including means for increasing the frequency of readout signals so that said readout signals are orthogonally related and matched filter means responsive thereto for distinguishing said signals from each other.

6. An information recording and readout system comprising means for generating a plurality of different input frequency signals which are harmonically related to a given frequency, means for encoding said input frequency signals to represent prescribed information at a rate at least twice said given frequency, means for recording said encoded signals, and readout means for determining said information at a substantially slower read rate including means for increasing the frequency of readout signals by at least a factor of two so that said readout signals are orthogonally related and matched filter means responsive thereto for distinguishing said signals from each other.

7. An information recording and readout system comprising means for generating a plurality of different input frequency signals which are harmonically related to a given frequency, means for encoding said input frequency signals to represent prescribed information producing a train of said frequency signals at a rate greater than said given frequency, means for recording said chain of signals, and readout means for determining said information at a substantially slower read rate including means for increasing the frequency of readout signals so that said readout signals are orthogonally related and matched filter means responsive thereto for distinguishing said signals from each other.

8. An information recording and readout system comprising means for generating a plurality of different input frequency signals which are harmonically related to a given frequency, means for encoding said input frequency signals to represent prescribed information producing a train of said frequency signals at a rate at least twice said given frequency, magnetic tape means for recording said chain of signals, and readout means for determining said information at a substantially slower read rate including means for increasing the frequency of readout signals by at least a factor of two so that said readout signals are orthogonally related and matched filter means responsive thereto for distinguishing said signals from each other.

9. An information recording and readout system comprising means for generating a plurality of different input frequency signals which are harmonically related to a given frequency, means for encoding said different input frequency signals so that each represents information, tape recording means for recording said encoded frequency signals at a rate greater than said given frequency, readout means for said tape recording means for reading said recorded signals at a substantially slower rate than said record rate and means for increasing the frequencies of said readout frequency signals producing corresponding frequency signals which are orthogonally related to each other, filter means including a plurality of filters each matched to a different one of said orthogonally related frequency signals for distingushing said signals from each other, and means responsive thereto for producing an output representative of such information.

10. An information recording and readout system comprising means for generating a plurality of different input frequency signals which are harmonically related to a given frequency, means for encoding said different input frequency signals so that each represents information, tape recording means for recording said encoded frequency signals at a rate at least twice said given frequency, readout means for said tape recording means for reading said recorded signals at a substantially slower rate than said record rate and means for increasing the frequencies of readout frequency signals by at least a factor of two producing corresponding frequency signals which are orthogonally related to each other, filter means including a plurality of filters each matched to a different one of said orthogonally related frequency signals for distinguishing said signals from each other, and means responsive thereto for producing an output representative of such information.

11. An information recording and readout system comprising means for generating a plurality of different input frequency signals which are harmonically related to a given frequency, means for encoding said signals forming a chain of frequency signals, the phase of each being selected to provide coherence between signals in the chain, means for encoding said frequency signals at a rate at least twice said given frequency, tape recording means for recording said encoded frequency signals, readout means for said tape recording means for reading said recorded signals at a substantially slower rate than said record rate and means for increasing the frequencies of said readout frequency signals by at least a factor of two producing corresponding frequency signals which are orthogonally related to each other and filter means including a plurality of filters each matched to a different one of said orthogonally related frequency signals for distingushing said signals from each other, and means for decoding the information represented by said orthogonally related frequency signals producing an output representative therof.

12. An information recording and readout system comprising means for generating a plurality of different input frequency signals which are harmonically related to a given frequency, said plurality of frequency signals including sets of odd and even harmonics of said given frequency, means for encoding said signals forming a chain of frequency signals, the phase of each signal being reversed when each follows a signal from a given one of said sets, means for transferring said encoded frequency signals at a rate at least twice said given frequency, tape recording means for recording said encoded frequency signals, and readout means for said tape recording means including means for increasing the frequencies of said readout frequency signals by at least a factor of two producing corresponding frequency signals which are orthogonally related to each other and filter means including a plurality of filters each matched to a different one of said orthogonally related frequency signals for distinguishing said signals from each other, and means for decoding the information represented by said orthogonally related frequency signals producing an output representative of such information.

13. An information storage and retrieval system comprising

- a source of different frequency signals which differ in frequency by integral multiples of a given frequency and represent information,
- means for storing said different frequency signals, at a rate substantially greater than said given frequency,
- means for detecting said stored frequency signals at a rate substantially less than said rate of storing, producing detected frequency signals, whereby corresponding source and detected frequencies are in the same ratio as the ratio of said storing rate to said detecting rate,
- means for multiplying frequency of each detected frequency signal by a common factor such that the multiplied detected frequencies differ from each other by integral multiples of said detecting rate, and
- means responsive thereto for producing the auto correlation functions of said multiplied detected frequency signals.

14. An information storage and retrieval system as in claim 13 and in which,

- the maximum frequency response of said storing means is substantially greater than the maximum frequency response required of said detecting means.

15. An information storage and retrieval system as in claim 13 and in which,

- said detecting rate is less than said given frequency.

16. An information storage and retrieval system as in claim 13 and in which,

- said different frequency signals are stored one after another.

17. An information storage and retrieval system as in claim 16 and in which, said stored frequency signals are detected one after another.

18. An information storage and retrieval system as in claim 17 and in which, said means for producing auto correlation function includes a plurality of filters each matched to a different one of said multiplied detected frequency signals, whereby the output thereof is representative of said information.

19. An information storage and retrieval system as in claim 18 and further including, means for controlling the duration of each retrieval interval during which said plurality of filters produces said output in response to each of said multiplied detected frequency signals coupled thereto, whereby said retrieval interval is substantially equal to the reciprocal of said detecting rate.

References Cited

UNITED STATES PATENTS

| | | | |
|---|---|---|---|
| 2,904,682 | 9/1959 | Rawlins ---------- | 179—100.2 |
| 3,036,157 | 5/1962 | Franco et al. -------- | 178—67 |

OTHER REFERENCES

"Frequency Code Telemetering System," by H. B. Schultheis, Jr., Electronics Magazine, April 1954, pages 172–175.

BERNARD KONICK, *Primary Examiner.*

V. P. CANNEY, *Assistant Examiner.*